US007343904B2

(12) United States Patent
Jo

(10) Patent No.: US 7,343,904 B2
(45) Date of Patent: Mar. 18, 2008

(54) CANISTER CLOSE VALVE DEVICE

(75) Inventor: Gil Hyun Jo, Gunpo-si (KR)

(73) Assignee: P & K Industry Co., Ltd, Incheon (KR)

( * ) Notice: Subject to any disclaimer, the term of this patent is extended or adjusted under 35 U.S.C. 154(b) by 0 days.

(21) Appl. No.: 11/469,155

(22) Filed: Aug. 31, 2006

(65) Prior Publication Data

US 2007/0256669 A1 Nov. 8, 2007

(30) Foreign Application Priority Data

May 8, 2006 (KR) ..................... 10-2006-0040974

(51) Int. Cl.
*F02M 33/02* (2006.01)
*G02M 3/04* (2006.01)

(52) U.S. Cl. ...................................... 123/519; 73/49.2

(58) Field of Classification Search ................ 123/519, 123/520, 189 D; 73/49.2, 49.7, 118.1
See application file for complete search history.

(56) References Cited

U.S. PATENT DOCUMENTS

| | | | | | |
|---|---|---|---|---|---|
| 4,700,683 | A | * | 10/1987 | Uranishi et al. | 123/519 |
| 5,181,497 | A | * | 1/1993 | Matsushita et al. | 123/520 |
| 5,190,015 | A | * | 3/1993 | Nakata et al. | 123/520 |
| 5,331,560 | A | * | 7/1994 | Tamura | 701/115 |
| 5,345,917 | A | * | 9/1994 | Maruyama et al. | 123/520 |
| RE35,054 | E | * | 10/1995 | Chikamatsu et al. | 123/519 |
| 5,601,065 | A | * | 2/1997 | Tamura et al. | 123/516 |
| 6,161,526 | A | * | 12/2000 | Sakata et al. | 123/519 |
| 6,338,336 | B1 | * | 1/2002 | Iida | 123/674 |
| RE37,895 | E | * | 10/2002 | Kuroda et al. | 123/520 |
| 6,761,058 | B2 | * | 7/2004 | Yamaguchi et al. | 73/40.5 R |
| 7,267,113 | B2 | * | 9/2007 | Tsuge et al. | 123/520 |
| 2001/0049958 | A1 | * | 12/2001 | Yamaguchi et al. | 73/40.5 R |
| 2005/0199216 | A1 | * | 9/2005 | Matsumoto | 123/396 |

FOREIGN PATENT DOCUMENTS

| | | |
|---|---|---|
| CA | 2539516 | 12/2006 |

* cited by examiner

*Primary Examiner*—John T. Kwon
(74) *Attorney, Agent, or Firm*—Greenlee, Winner and Sullivan P.C.

(57) ABSTRACT

Disclosed herein is a canister close valve device for opening or closing a passage of a canister collecting evaporation gas evaporated in a fuel tank and a passage communicating with the atmosphere. The canister close valve device includes a housing which has a first vapor line making the fuel tank communicate with a canister, a second vapor line making the atmosphere communicate with the canister, and a coupling part coupling the first vapor line to the second vapor line. Further, the device includes a first diaphragm valve assembly opening or closing the first vapor line, a second diaphragm valve assembly opening or closing the second vapor line, and a solenoid valve mounted to the coupling part and including a magnetic body which is coaxially and slidably connected to the first and second diaphragm valve assemblies to move the first and second diaphragm valve assemblies.

6 Claims, 6 Drawing Sheets

CANISTER CLOSE VALVE DEVICE

CROSS REFERENCE TO RELATED APPLICATIONS

This application claims benefit of Korean Patent Application No. 10-2006-0040974, filed on May 8, 2006, which is incorporated herein by reference in its entirety.

BACKGROUND OF THE INVENTION

The present invention relates generally to a valve device and, more particularly, to a valve device which is adapted to an On-Board Diagnostics-II (OBD-II) system for diagnosing leakage or faults in a fuel system or fuel vapor purge system for vehicles.

Recently, vehicles exported to North America and domestic vehicles are usually equipped with a leakage and fault diagnosing system, which is provided in a fuel tank and a fuel or fuel vapor prevention device, thus allowing a driver to immediately be made aware of a fault.

A vehicle equipped with a canister close valve is provided with a fuel-system protecting structure, which is constructed so that a safety pipe is mounted on a pipeline coupling a canister to the canister close valve, thus preventing a fuel system from being broken or damaged by fuel vapor.

As well known to those skilled in the art, research on all aspects of exhaust-gas purging by a vehicle has been conducted. However, since harmful elements are produced by various causes, it is not easy to purge all harmful elements produced by different causes. Meanwhile, the main element of fuel vapor contained in the harmful exhaust gas is hydrocarbon (HC). Hydrocarbons are harmful to the respiratory organs and eyes. Further, hydrocarbons combine with nitrous oxide, thus forming photochemical smog.

For these reasons, the U.S. Environmental Protection Agency and the California Air Resources Board require the prevention of fuel vapor from being discharged to the atmosphere when the amount of fuel vapor leaking from a pipe extending from a fuel tank to an intake manifold is measured and the measured amount exceeds a permissible amount. Further, they propose a diagnostic device or a leakage diagnosis method.

Meanwhile, various systems for suppressing fuel vapor have been proposed. Among them, a charcoal canister method using activated charcoal is executed as follows. That is, hydrocarbons contained in fuel vapor which is evaporated in a fuel tank 1 are collected in a canister 4 which stores activated charcoal therein. When a canister close valve (CCV) 5 is opened, the collected hydrocarbons are discharged from the canister 4 by external air flowing through the canister close valve 5. The hydrocarbons pass through a purge control valve 7, a surge tank 6, and an intake pipe 12, and are supplied to a combustion chamber to be burned in the combustion chamber.

Further, in such a fuel vapor suppressing system, fine holes may be formed in an evaporation-gas line, and evaporation gas may leak from the evaporation-gas line. In this case, the leaking evaporation gas causes atmospheric pollution. Thus, it is determined that the evaporation-gas suppressing system is out of order. At this time, a fault detection lamp is turned on, thus informing a driver of the fault. Such an operation is called an operation of monitoring the fuel vapor suppressing system.

In this case, the canister close valve 5 closes the fuel system in a monitoring area. When the hardware of the canister close valve 5 is stuck closed, it may not function. This event is detected by an electronic control unit (not shown), thus stopping a canister purge operation, therefore preventing damage due to the excessive reduction in pressure of the fuel system.

Further, even if the canister close valve 5 develops such an error but a user does not take appropriate measures quickly, the pressure of the closed fuel system increases due to fuel vapor. When fuel temperature is relatively high, especially as in the summer, and pressure is not appropriately discharged, the pressure of the fuel system is continuously increased by fuel vapor, and thus the fuel tank 1, the canister 4, and a vapor separator may break.

SUMMARY OF THE INVENTION

Accordingly, the present invention has been made keeping in mind the above problems occurring in the prior art, and an object of the present invention is to provide a canister close valve device, in which an automatic opening device, opened before a fuel system is damaged when excessive pressure acts on the fuel system, is provided on a canister close valve, thus allowing the pressure to be smoothly discharged, and preventing the pressure of the fuel system from being continuously increased by fuel vapor, therefore preventing a fuel tank, a canister, a vapor separator, and other components from being broken or damaged.

Further, the present invention has been made keeping in mind the above problems occurring in the prior art, and another object of the present invention is to provide a canister close valve device having increased reliability, thus maintaining the original function of a canister close valve (CCV), protecting a fuel tank, and preventing clogging from occurring.

In order to accomplish the objects, the present invention provides a canister close valve device for opening or closing a passage of a canister collecting evaporation gas evaporated in a fuel tank and a passage communicating with the atmosphere. The canister close valve device includes a housing having a first vapor line making the fuel tank communicate with a canister, a second vapor line arranged to be spaced apart from the first vapor line by a predetermined distance and to be parallel to the first vapor line, and making the atmosphere communicate with the canister, and a coupling part coupling the first vapor line to the second vapor line. Further, the device includes a first diaphragm valve assembly opening or closing the first vapor line, a second diaphragm valve assembly opening or closing the second vapor line, and a solenoid valve mounted to the coupling part, and including a magnetic body which is coaxially and slidably connected to the first and second diaphragm valve assemblies to move the first and second diaphragm valve assemblies. In this case, the magnetic body is connected to a first stem of the first diaphragm valve assembly, the first stem is latched to a spool connected to a second stem of the second diaphragm valve assembly, and the first and second diaphragm valve assemblies have on respective rear surfaces thereof first and second return springs to bias the first and second diaphragm valve assemblies.

DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Hereinafter, a canister close valve device according to the present invention will be described with reference to the accompanying drawings.

Figure 1:
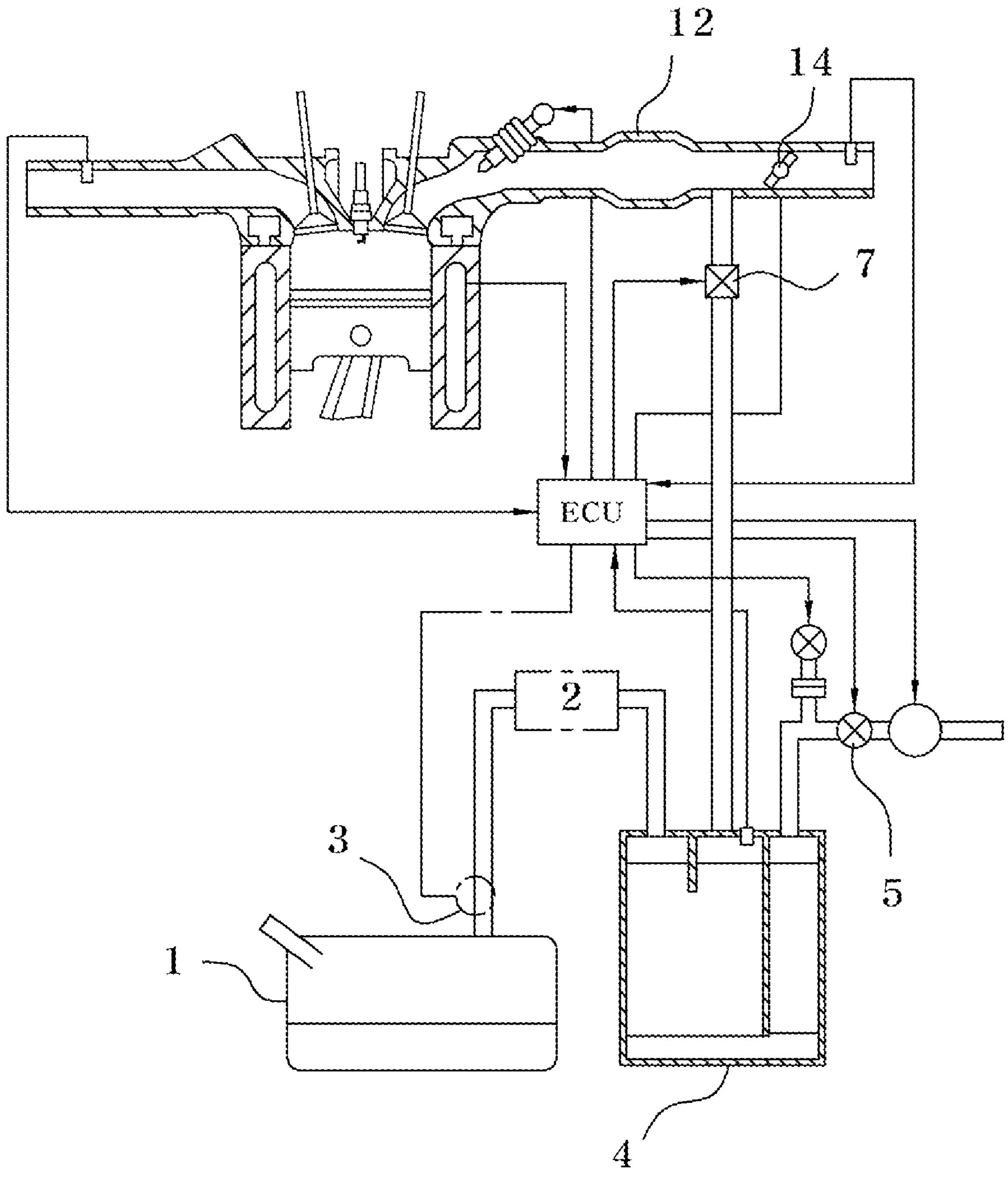
FIG. 1 is a view schematically showing the construction of a conventional evaporation-gas control device for vehicles.
Figure 2:
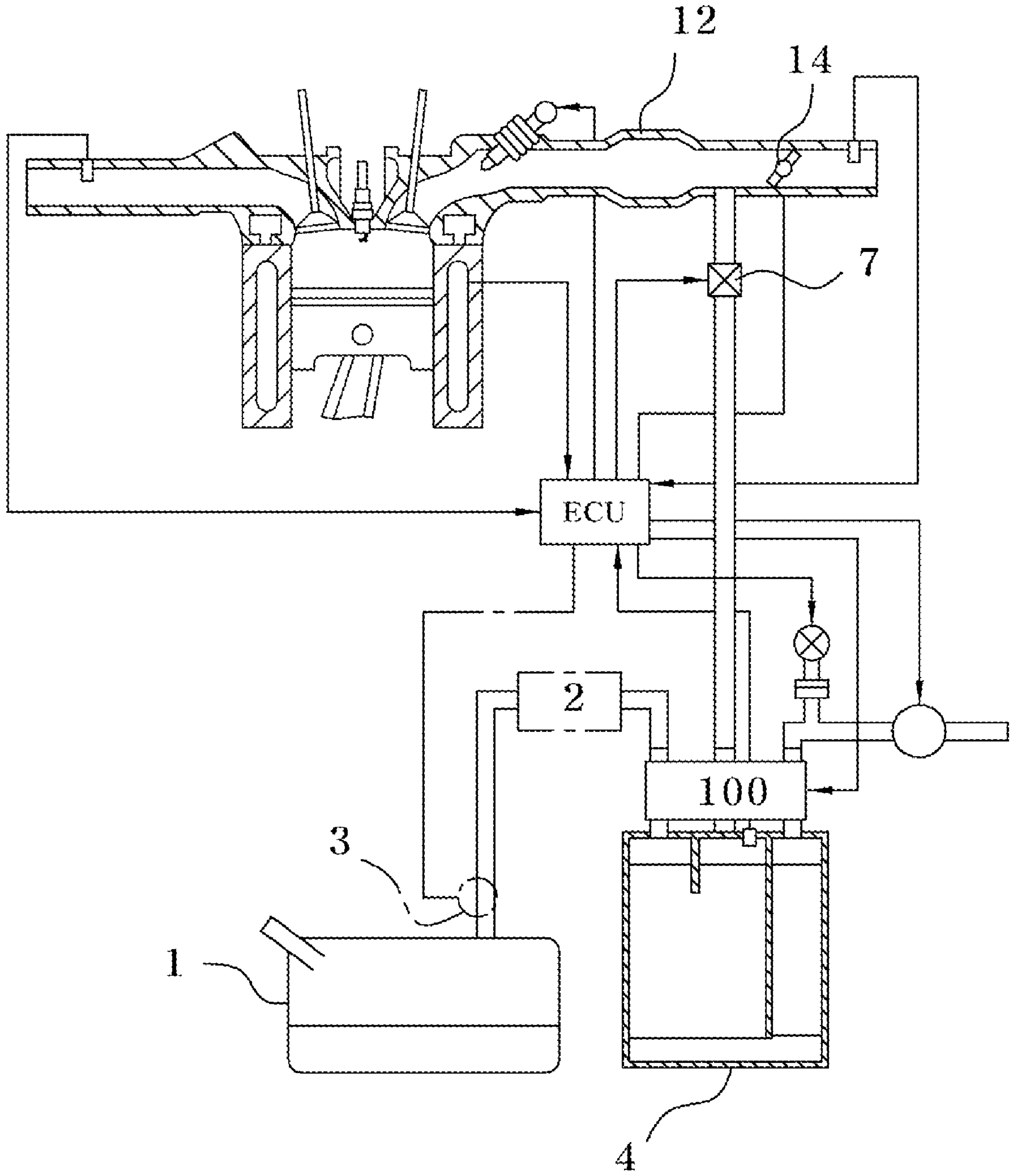
FIG. 2 is a view schematically showing the construction of an evaporation-gas control device for vehicles, employing the present invention.
Figure 3:
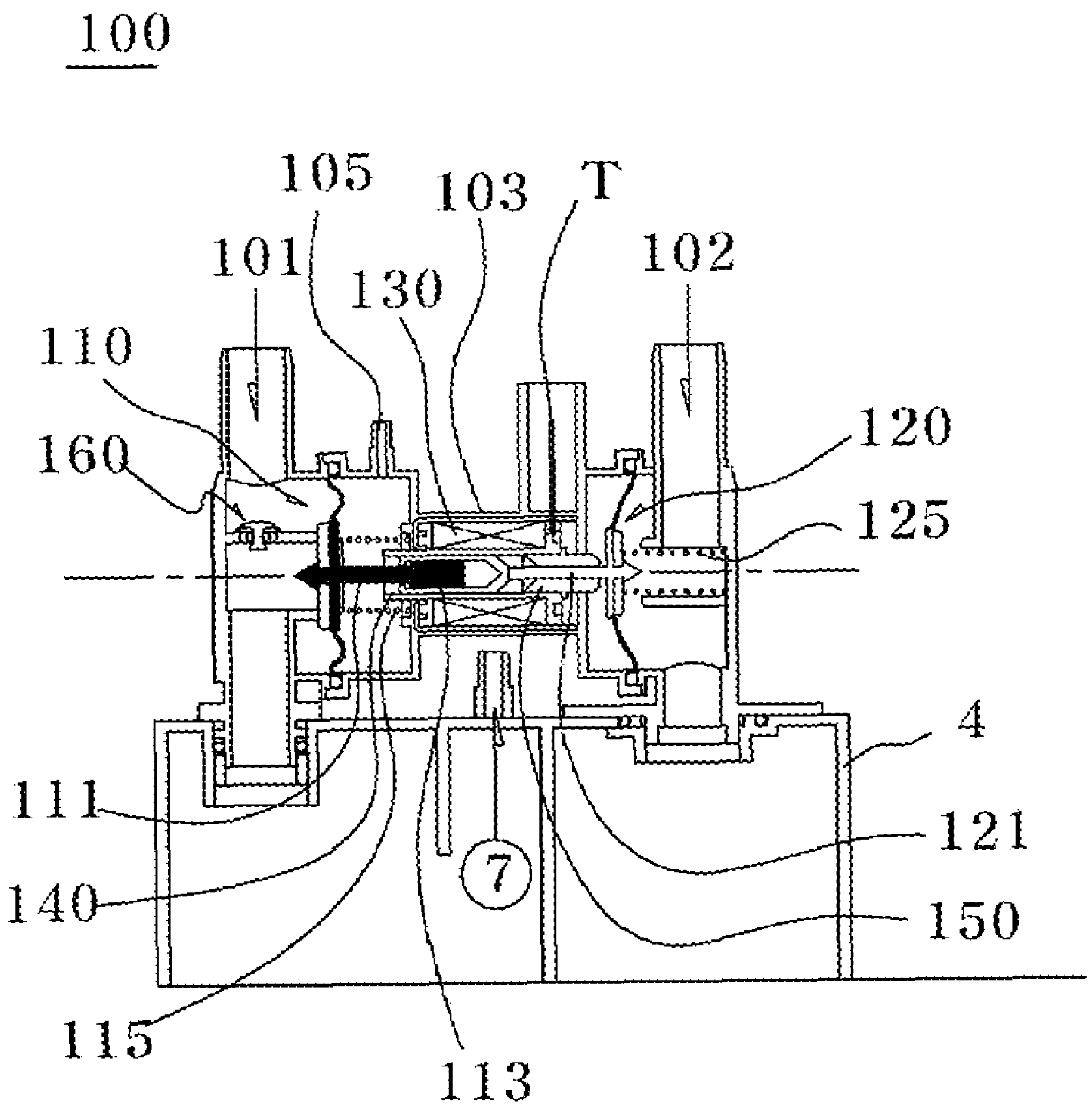
FIG. 3 is a sectional view of a canister close valve device in a normal operation state, according to the present invention.
Figure 4:
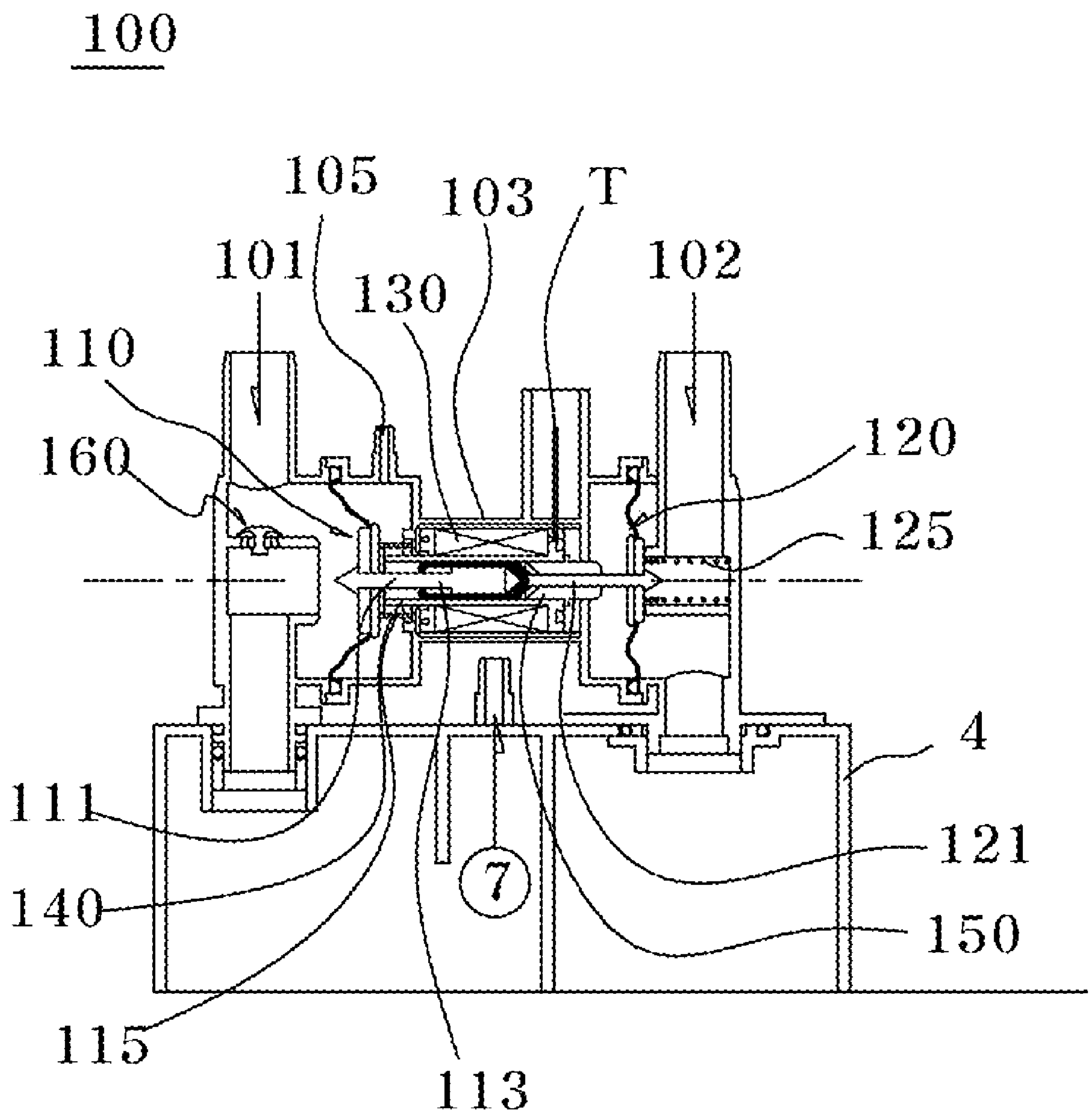
FIG. 4 is a sectional view of the canister close valve device in a monitoring state, according to the present invention.
Figure 5:
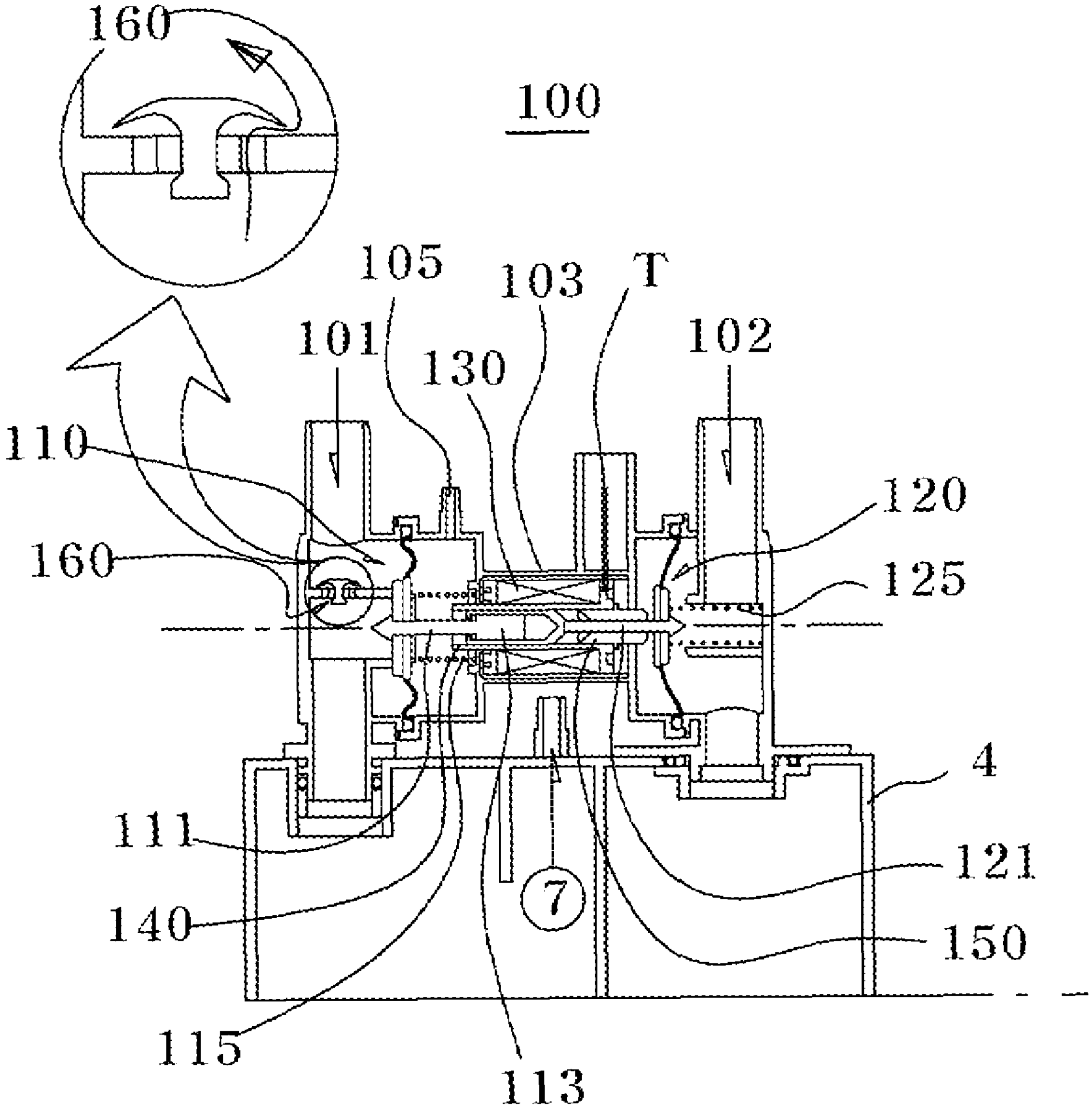
FIG. 5 is a sectional view of the canister close valve device when abnormal negative pressure acts on a fuel system, according to the present invention.

FIG. 2 is a view schematically showing the construction of an evaporation-gas control device for vehicles, employing the present invention, FIG. 3 is a sectional view of a canister close valve device in a normal operation state, according to the present invention. FIG. 4 is a sectional view of the canister close valve device in a monitoring state, according to the present invention, and FIG. 5 is a sectional view of the canister close valve device when abnormal negative pressure acts on a fuel system, according to the present invention.

In order to aid in understanding the present invention, the basic construction of the canister close valve device according to this invention will be described. That is, the canister close valve device is constructed so that a first vapor line 101 extending to a fuel tank 1 and a second vapor line 102 extending to the atmosphere are integrated with each other and are adapted to a canister 4.

The canister close valve device 100 includes the canister 4 for collecting evaporation gas which is evaporated in the fuel tank 1, and a canister close valve which opens or closes a passage communicating with the atmosphere.

In this case, the canister close valve device 100 includes a housing accommodating the first vapor line 101, the second vapor line 102, and a coupling part 103. The first vapor line 101 makes the fuel tank 1 communicate with the canister 4. The second vapor line 102 makes the atmosphere communicate with the canister 4, and is arranged such that it is spaced apart from the first vapor line 101 by a predetermined distance and is parallel to the first vapor line 101. The coupling part 103 couples the first vapor line 101 to the second vapor line 102.

The housing is provided with a first diaphragm valve assembly 110, a second diaphragm valve assembly 120, and a solenoid valve 130. The first diaphragm valve assembly 110 functions to open or close the first vapor line 101. The second diaphragm valve assembly 120 functions to open or close the second vapor line 102. The solenoid valve 130 is mounted to the coupling part 103, and is provided with a magnetic body 113 which is coaxially and slidably connected to the first and second diaphragm valve assemblies 110 and 120 to move the first and second diaphragm valve assemblies 110 and 120.

Further, the magnetic body 113 is connected to a first stem 111 of the first diaphragm valve assembly 110. The first stem 111 is latched to a spool 140 coupled to a second stem 121 of the second diaphragm valve assembly 120.

The first stem 111 is slidably inserted into the hollow spool 140 which is connected to the second stem 121 of the second diaphragm valve assembly 120. First and second return springs 115 and 125 are elastically supported on rear surfaces of the first and second diaphragm valve assemblies 110 and 120, respectively.

Further, a check valve 160 is mounted on the first vapor line 101 so as to make the fuel tank 1 communicate with the canister 4 again, when the first vapor line 101, which makes the fuel tank 1 communicate with the canister 4, is closed by the first diaphragm valve assembly 110 and negative pressure acts on the fuel tank 1.

The second stem 121 is connected to a bushing 150 which is secured to an end of the coupling part 103 so as to keep the solenoid valve 130 and the second vapor line 102 sealed.

Further, a regulator 105 is provided on the first vapor line 101 to regulate the pressure of a chamber defined between the first diaphragm valve assembly 110 and the spool 140 connected to the solenoid valve 130, thus allowing the first diaphragm valve assembly 110 to be smoothly operated.

Hereinafter, the operational effect of this invention will be described in detail with reference to the accompanying drawings.

FIG. 2 is a view schematically showing the construction of an evaporation-gas control device for vehicles, employing the present invention. As shown in the drawings, the canister close valve device for protecting the fuel system according to the present invention is constructed so that the vapor separator 2 is connected to the fuel tank 1 via a pipeline, a pressure sensor 3 is installed at a predetermined position on the pipeline to detect the pressure of gas which is evaporated in the fuel tank 1, and the canister 4 for storing fuel vapor is connected to the vapor separator 2 via a pipeline.

Further, a pipeline is connected to a predetermined position of the canister 4 so as to allow external air to flow into the canister 4. The canister close valve device 100 is installed at a predetermined position on the pipeline, and is turned on or off in response to a signal from an electronic control unit (ECU), thus controlling the inflow of air. The surge tank 6, which stores intake air flowing through a throttle valve 14, is connected to the canister 4 via a pipeline. The purge control valve 7 is installed at a predetermined position on the connecting pipeline, and is turned on or off in response to a signal from the ECU to allow evaporation gas collected in the canister 4 to flow through the surge tank 6 into the combustion chamber.

Such a construction undergoes a self-diagnostic operation to determine whether HC gas, which is the main element of gasoline fuel used in the fuel system including the fuel tank 1, the pipelines, etc., is discharged to the atmosphere, and to show a warning message to passengers. To this end, the canister close valve device 100 constructed as described above is repeatedly opened or closed, and determines whether the airtightness of the fuel system is maintained under the control of the ECU.

In this case, in order to check the ability of the fuel system to maintain airtightness, whether internal pressure maintains a preset value must be determined. When the close valve device 100 is opened or closed, the pressure sensor 3 detects the variation in pressure and compares the detected pressure with reference data, thus monitoring the internal-pressure maintaining capability. In this case, the pressure sensor for measuring the pressure may be installed in the fuel tank 1.

In other words, the evaporation gas evaporated in the fuel tank 1 is separated by the vapor separator 2 prior to being collected in the canister 4. The evaporation gas absorbed by active charcoal contained in the canister 4 passes through the purge control valve 7, the surge tank 6, and an intake pipe to the combustion chamber, so that combustion is performed. The operation of diagnosing the leakage of fuel vapor is performed as follows. As the purge control valve 7 and the canister close valve 100 are manipulated, the pressure in the fuel tank 1 is changed. The variation in pressure is detected by the pressure sensor 3, thus determining the leakage of vapor gas.

In this case, the second vapor line is always kept open, thus providing fresh air to purge evaporation gas. Meanwhile, when it is required to perform the monitoring operation, the second vapor line is closed, and the purge control valve 7 and the canister close valve 100 are manipulated. At this time, the variation in pressure in the fuel tank 1 is detected by the pressure sensor 3, so that the leakage of evaporation gas is determined.

However, the canister close valve 5 may be mechanically stuck closed. For example, excessive pressure acts on a fuel system 12, or the internal pressure of the housing is changed, so that the restoring operation of the first and second diaphragm valve assemblies 110 and 120 may be hindered.

Owing to the intake structure of the solenoid valve 130, the pipeline coupling the canister close valve device 100 to the canister 4 can be airtightly sealed. As shown in FIGS. 3 to 5, the solenoid valve 130 attracts the magnetic body 113, thus attracting the first diaphragm valve assembly 110. By such an operation, the first vapor pipe 101 is opened. Meanwhile, the first and second diaphragm valve assemblies 110 and 120 are returned to their original positions by the first and second return springs 115 and 125.

As such, even if excessive pressure acts on the fuel system 12 or the internal pressure of the housing is changed, so that an inner pipe is damaged and thus the restoring operation of the first and second diaphragm valve assemblies 110 and 120 is hindered, the regulator 105 is provided in the first vapor line 101 to regulate the pressure in the chamber defined between the first diaphragm valve assembly 110 and the spool 140 connected to the solenoid valve 130, thus allowing the first diaphragm valve assembly 110 to be smoothly operated.

Of course, when excessive positive pressure is generated by excessive evaporation gas produced in the fuel tank 1, the first diaphragm valve assembly 110 overcomes the tension of the first return spring 115, and the fuel tank communicates with the canister 4, so that the excessive pressure is reduced to normal pressure.

Meanwhile, in order to prevent the fuel system from breaking below a pressure level which may destroy the fuel system including the fuel tank 1, the check valve 160 is manufactured to have tension which is suitable for starting opening the first diaphragm valve assembly 110. Generally, negative pressure acting on the fuel system 12 when the emission suppressing system is monitored is about −12 hPa to −15 hPa. When the canister close valve 5 is normally opened, the pressure ranges from atmospheric pressure to 5 hPa. Assuming that critical pressure is set to about 18 hPa, the check valve 160 is opened to sufficiently cope with abnormal negative pressure.

Further, when an error is detected in the canister close valve device 100, it is stored in the ECU in the form of a fault code. Thus, when the canister close valve device 100 is mounted to an engine room, both the canister close valve device 100 and the engine room can be simultaneously checked during the repair of the canister close valve device 100, thus enhancing convenience.

Further, when the monitoring operation is completed or interrupted, the supply of electricity is stopped, and the returning operation is executed using force of the first and second return springs 115 and 125 and force resulting from the difference in sectional area of the first and second diaphragm valve assemblies 110 and 120. Thus, even if the pressure in the monitoring operation is abnormal, the returning operation is normally executed using the difference in sectional area of the diaphragm valve assemblies.

As described above, the present invention uses a dual diaphragm structure, and the solenoid valve is adapted to individually operate both of the diaphragms. The effects expected from such a structure are as follows. First, when the OBD-II system is monitored, a passage communicating with the atmosphere is completely closed, whereas a passage communicating with the fuel tank is open, thus allowing test pressure to be smoothly transmitted. Second, when a fuel charging operation is performed or positive pressure is generated in the fuel tank in an Onboard Refueling Vapor Recovery (ORVR) system, the pressure is efficiently discharged to the canister, and the emission of evaporation gas into the canister is suppressed under normal conditions. Third, when the purge operation is performed, negative pressure is prevented from being transmitted to the fuel tank, thus preventing the fuel tank from being destroyed. Fourth, when the purge operation is performed, the passage communicating with the fuel tank is closed, and the passage communicating with the atmosphere is opened, thus efficiently removing the evaporation gas absorbed by the active charcoal, therefore maximizing the purge characteristics.

Figure 6:
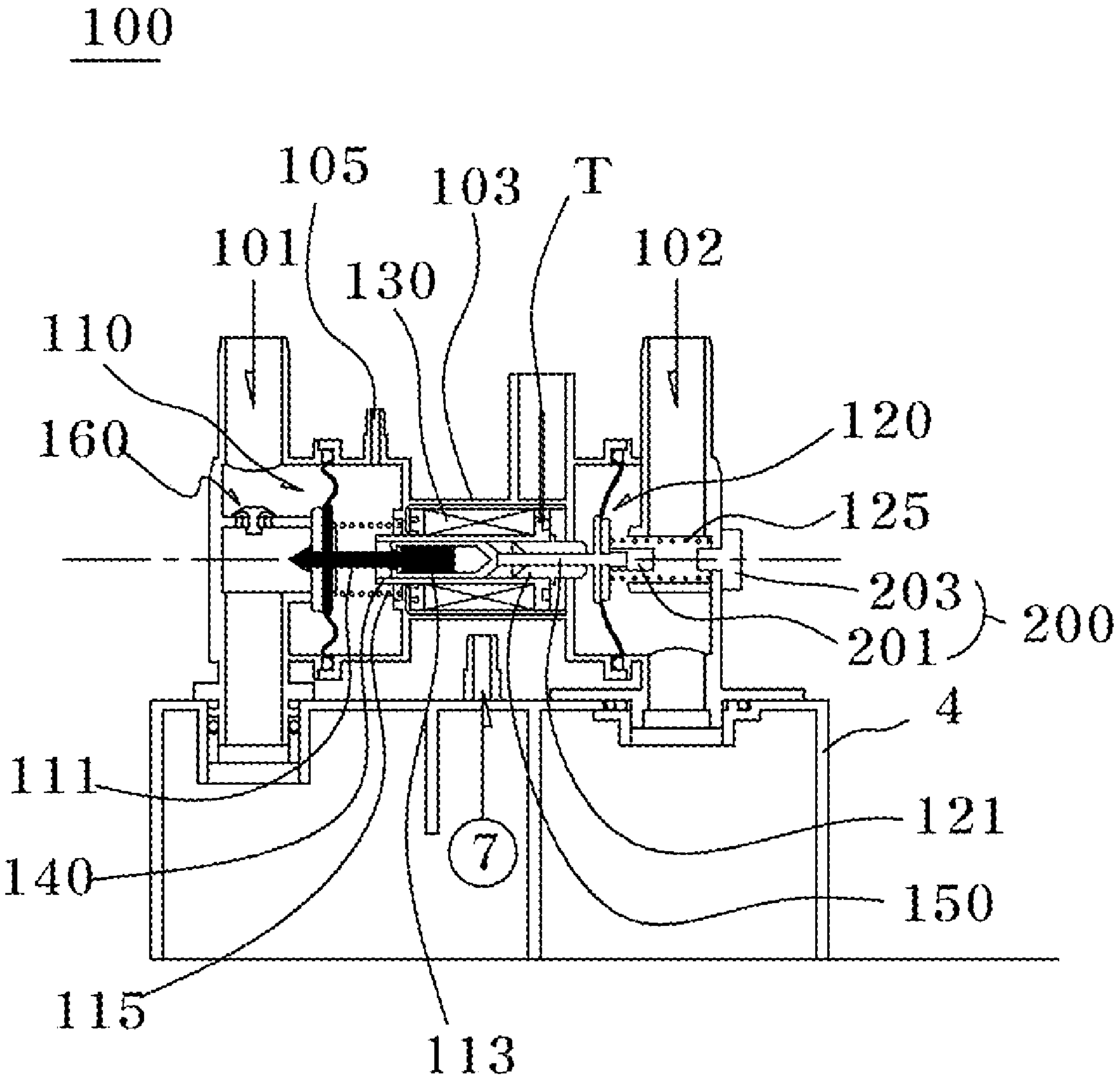
FIG. 6 is a sectional view of the canister close valve device including a proximity switch, in the normal operation state of the fuel system, according to the present invention.

Meanwhile, when electricity is applied to the solenoid valve 130, the magnetic body 113 is magnetized and generates attractive force. The attractive force is larger than the load of the first and second return springs 115 and 125, so the second diaphragm valve assembly 120 closes, and thus the passage communicating with the atmosphere is closed. However, as shown in FIG. 6, in order to prevent a serious problem, such as damage to the tank, even if the passage communicating with the atmosphere is completely closed by external shocks, the bending of the pipe, or the clogging of a filter, a proximity switch 200 is mounted to the front end of the second diaphragm valve assembly, as seen from the moving direction thereof. The proximity switch detects the abnormal closing state, thus stopping the purge operation and indicating the requirement to replace the filter via the ECU, therefore promoting safe driving.

Preferably, the proximity switch 200 comprises a magnetic proximity switch which is constructed so that a magnet 201 and a lead switch 203 are mounted to the second diaphragm valve assembly 120 and the second vapor line 102, respectively.

In order words, when the filter of the passage communicating the atmosphere is clogged and excessive negative pressure is generated in the canister, a large differential pressure is generated at both ends of the second diaphragm valve assembly 120, so that the second diaphragm valve assembly 120 moves in the direction that closes the passage communicating with the atmosphere. At this time, the switch is operated to indicate abnormal operation. The detected signal informs a driver of the stoppage of the purge operation and the requirement to replace the filter.

As described above, according to the present invention, when excessive pressure or abnormal negative pressure acts on a fuel system, first and second diaphragm valve assemblies are operated to discharge the pressure before the fuel system is damaged, thus protecting the fuel system and saving on repair costs.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A canister close valve device for opening or closing a passage of a canister collecting evaporation gas evaporated in a fuel tank and a passage communicating with the atmosphere, the canister close valve device comprising:

a housing, comprising:

a first vapor line making the fuel tank communicate with a canister;

a second vapor line arranged to be spaced apart from the first vapor line by a predetermined distance and to be parallel to the first vapor line, the second vapor line making the atmosphere communicate with the canister; and a coupling part coupling the first vapor line to the second vapor line;

a first diaphragm valve assembly opening or closing the first vapor line;

a second diaphragm valve assembly opening or closing the second vapor line; and a solenoid valve mounted to the coupling part, and including a magnetic body which is coaxially and slidably connected to the first and second diaphragm valve assemblies to move the first and second diaphragm valve assemblies;

wherein the magnetic body is connected to a first stem of the first diaphragm valve assembly, the first stem is latched to a spool connected to a second stem of the second diaphragm valve assembly, and the first and second diaphragm valve assemblies have on respective rear surfaces thereof first and second return springs to bias the first and second diaphragm valve assemblies.

2. The canister close valve device as set forth in claim 1, wherein the first stem is slidably inserted into the hollow spool connected to the second stem of the second diaphragm valve assembly.

3. The canister close valve device as set forth in claim 1, wherein a check valve is mounted on the first vapor line to restore communication of the fuel tank with the canister, when the first vapor line, making the fuel tank communicate with the canister, is closed by the first diaphragm valve assembly and negative pressure is applied to the fuel tank.

4. The canister close valve device as set forth in claim 1, wherein the second stem is connected to a bushing provided on an end of the coupling part to keep the solenoid valve and the second vapor line sealed.

5. The canister close valve device as set forth in claim 1, wherein the first vapor line is provided with a regulator to regulate pressure acting between the first diaphragm valve assembly and the spool connected to the solenoid valve.

6. The canister close valve device as set forth in claim 1, wherein the second diaphragm valve assembly has on an end thereof a proximity switch to detect that the passage communicating with the atmosphere is completely closed by the second diaphragm valve assembly due to external shocks, the bending of a pipe, or the clogging of a filter.

* * * * *